(12) United States Patent
Quere

(10) Patent No.: US 7,956,504 B2
(45) Date of Patent: Jun. 7, 2011

(54) COMPOSITE ELECTROMECHANICAL MACHINES WITH GEAR MECHANISM

(76) Inventor: Eric Stephane Quere, Los Altos, CA (US)

( * ) Notice: Subject to any disclaimer, the term of this patent is extended or adjusted under 35 U.S.C. 154(b) by 0 days.

(21) Appl. No.: 12/210,169

(22) Filed: Sep. 12, 2008

(65) Prior Publication Data

US 2009/0072645 A1 Mar. 19, 2009

Related U.S. Application Data

(60) Provisional application No. 60/993,904, filed on Sep. 13, 2007, provisional application No. 60/993,961, filed on Sep. 13, 2007.

(51) Int. Cl.
*H02K 1/22* (2006.01)
(52) U.S. Cl. .......................................... 310/114; 310/83
(58) Field of Classification Search .......... 310/112–114, 310/266, 83, 80
See application file for complete search history.

(56) References Cited

U.S. PATENT DOCUMENTS

| | | | |
|---|---|---|---|
| 4,794,286 A | 12/1988 | Taenzer | |
| 6,297,575 B1 * | 10/2001 | Yang | 310/266 |
| 6,380,653 B1 * | 4/2002 | Seguchi | 310/112 |
| 6,590,312 B1 * | 7/2003 | Seguchi et al. | 310/266 |
| 6,710,492 B2 | 3/2004 | Minagawa | |
| 6,924,574 B2 | 8/2005 | Qu et al. | |
| 6,998,757 B2 | 2/2006 | Seguchi et al. | |
| 7,154,191 B2 | 12/2006 | Jansen et al. | |
| 7,154,192 B2 | 12/2006 | Jansen et al. | |
| 7,154,193 B2 | 12/2006 | Jansen et al. | |
| 7,250,702 B2 | 7/2007 | Abou Akar et al. | |
| 7,414,343 B2 * | 8/2008 | Arita et al. | 310/181 |
| 2006/0175923 A1 | 8/2006 | Abou Akar et al. | |

* cited by examiner

*Primary Examiner* — Dang D Le
(74) *Attorney, Agent, or Firm* — Tue Nguyen

(57) ABSTRACT

Embodiments of the present invention include a composite electromechanical machine which can operate as a motor or a generator (including dynamo or alternator). In an aspect, the present composite electromechanical machine consists of at least two rotating elements (rotor) and one stationary element (stator) where the two rotating elements are coupled through a gear mechanism. The gear mechanism can combine the torque of the inner and the outer rotor, preferably using helical gears which have lower noise level and higher contact area. The gear mechanism can also act as a locking mechanism to keep the outer rotor in place. The gear mechanism can have a first gear coupled to the inner rotor and a second gear coupled to the outer rotor. In an embodiment, the first and second gears are coupled together to connect the inner and the outer rotors. The gear mechanism can further include a third gear coupled to the double-sided stator. In an embodiment, the first and third gears and the second and third gears are coupled to each other, respectively. Other embodiments can also be included.

20 Claims, 9 Drawing Sheets

A - A

B - B

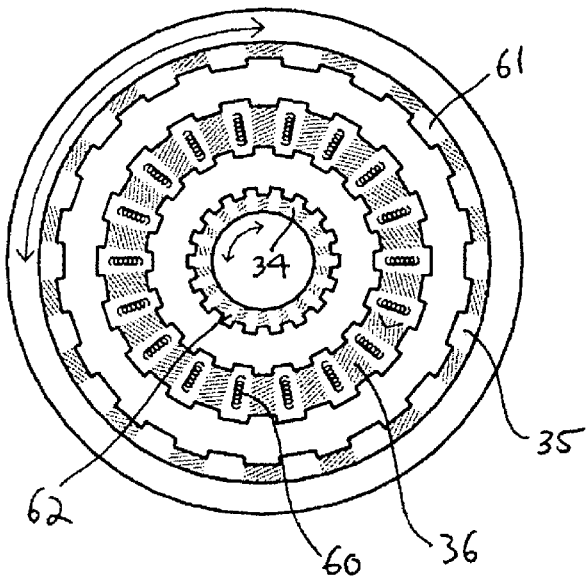
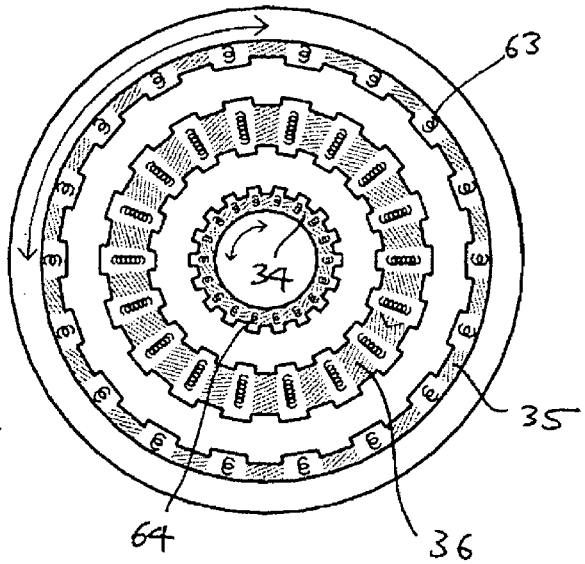
Fig. 6A  Fig. 6B
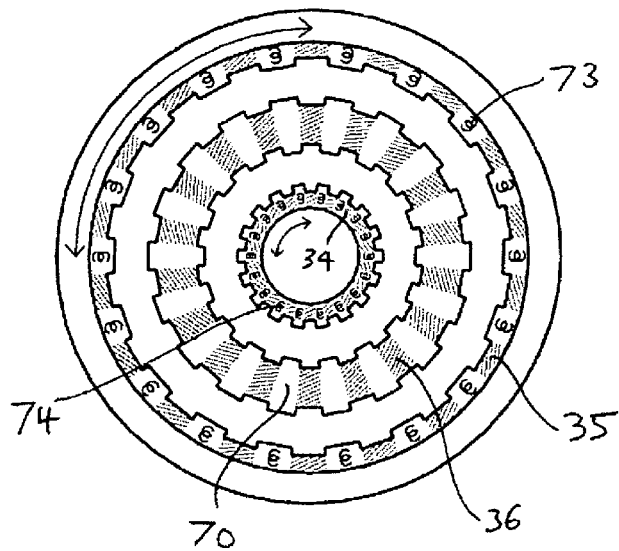
Fig. 7

COMPOSITE ELECTROMECHANICAL MACHINES WITH GEAR MECHANISM

This application claims priority from U.S. provisional patent application Ser. No. 60/993,904, filed on Sep. 13, 2007, entitled "Multiple layer (brush/brushless)"; and from U.S. provisional patent application Ser. No. 60/993,961, filed on Sep. 13, 2007, entitled "Double rotator, brush", which are incorporated herein by reference.

This application is related to co-pending application Ser. No. 12/210,171, filed on Sep. 12, 2008, entitled "Composite electromechanical machines with uniform magnets".

The present invention relates generally to electromechanical machines, such as motor, generator, dynamo, or alternators, and particularly to composite electromechanical machines.

BACKGROUND

Electromechanical machines such as alternator, motor, dynamo, and generator can convert energy between mechanical energy and electrical energy. For example, an electric motor uses electrical energy to produce mechanical energy, and a generator or dynamo uses mechanical energy to produce electrical energy. In general, an electromechanical machine can operate as a motor or as a generator, depending on the applied input energy. The major differences between a motor and a generator can be in the desired optimization, for example, a motor is designed to optimize speed or torque, and a generator is designed to optimize power generation. Thus the following descriptions are directed to electromechanical machine, which can be equally applied to motors and generator.

The electromechanical machine can convert between mechanical energy and electrical energy through magnetic interaction. From a mechanical point of view, the electromechanical machine comprises a stator which is a stationary part, and a rotor which is a rotating part. For example, a motor converts electrical power to mechanical power in its rotor, through a power supplied to the stator and/or the rotor. From an electrical point of view, the electromechanical machine comprises an armature which is the power-producing component (and which can be either the rotor or the stator), and the field component which is the magnetic field component (and which can also be either the rotor or the stator and can be either an electromagnet or a permanent magnet). The following descriptions use rotor and stator in describing electromechanical machine, which can be equally applied to armature and field component. In addition, the following descriptions sometimes use the term "magnetic component" or "magnetic plane" of an electromechanical machine to represent the stator, the rotor, the armature or the field component.

Electrical machines may take the form of DC motors or AC motors with various types such as induction, brushed, brushless, universal, stepper, linear, unipolar, reluctance. However, this classification is not a rigid distinction, especially with advances in electronic control, e.g., moving the commutator out of the motor shell.

There are several ways to supply/generate power to/from an electromechanical machine. In a motor, the supplied power can be from a DC source (DC motor), an AC source (AC motor), or induced in the rotating device (induction motor). AC source can be single-phase or polyphase power systems. For example, two-phase electrical power can have 4 or 3 wires to provide 2 voltage phases, differing by 90 degrees. Three-phase electric power provides 3 voltage phases, differing by 120 degrees. Polyphase power can provide any number of phases, usually three, or a multiple of three.

In addition, motors can incorporate single or double multiphase winding set that is connected to a power supply. For example, doubly-fed electric motors have two independent multiphase windings that actively participate in the energy conversion process, and thus can provide twice the constant torque speed range as singly-fed electric machines.

SUMMARY OF THE DESCRIPTION

Embodiments of the present invention include a composite electromechanical machine which can operate as a motor or a generator (including dynamo or alternator). In an aspect, the present composite electromechanical machine comprises at least two rotating elements (rotor) and one stationary element (stator) where the two rotating elements are coupled through a gear mechanism.

The composite electromechanical machine comprises at least two rotor/stator pairs integrated together. In an aspect, the two stators form a double-sided stator having an inner stator side and an outer stator side. The composite double-sided stator can replace two separate inner stator and outer stator in coupling with an inner rotor and an outer rotor, respectively. The two rotors comprise an inner rotor and an outer rotor, where the inner rotor has a first rotor side facing the inner stator side and the outer rotor has a second rotor side facing the outer stator side. The stator and the rotors can comprise either a permanent magnet or a winding to generate a magnetic field. If the rotors comprise winding, a brush mechanism can be included to accommodate the winding.

The composite electromechanical machine can be a brushless machine with the rotor comprising a permanent magnet, and the double-sided stator comprising stator winding. The composite electromechanical machine can be a brush machine with the rotor (inner rotor, outer rotor or both rotors) comprising a winding, and the double-sided stator comprising a permanent magnet.

The composite electromechanical machine can comprise a gear mechanism to couple the movement of the inner rotor and the outer rotor. The gear mechanism can combine the torque of the inner and the outer rotor. The gear mechanism can comprise straight gears, or helical gears which have lower noise level and higher contact area. The gear mechanism can also act as a locking mechanism to keep the outer rotor in place.

The gear mechanism can comprise a first gear coupled to the inner rotor and a second gear coupled to the outer rotor. In an embodiment, the first and second gears are coupled together to connect the inner and the outer rotors. The gear mechanism can further comprise a third gear coupled to the double-sided stator. In an embodiment, the first and third gears and the second and third gears are coupled to each other, respectively.

In an embodiment, the composite electromechanical machine comprises additional pairs of rotor/stator. In an aspect, the inner rotor, the outer rotor, or both rotors can be a double-sided rotor, and the composite electromechanical machine further comprises a plurality of stators facing the plurality of double-sided rotors.

In further embodiments, the present invention includes an improvement to an electromechanical machine with a double-sided stator and inner/outer rotors. The improvement comprises a gear mechanism for coupling the inner rotor and the outer rotor for combining the torque. The present invention further includes an improvement to an electromechanical machine with an inner rotor. The improvement comprises a double-sided stator, an outer rotor and a gear mechanism for coupling the inner rotor and the outer rotor for combining the torque.

Other embodiments can also be included.

BRIEF DESCRIPTION OF THE DRAWINGS

FIGS. 6A-6B illustrate brushless and brushed schematic diagrams with a double-sided stator.

FIG. 7 illustrates a brushed schematic diagram with a double-sided stator.

DETAILED DESCRIPTION OF THE PREFERRED EMBODIMENTS

Embodiments of the invention include a composite motor or generator which comprises multiple rotor/stator pairs that are configured as double-sided stator and/or double-sided rotor.

Figure 1:
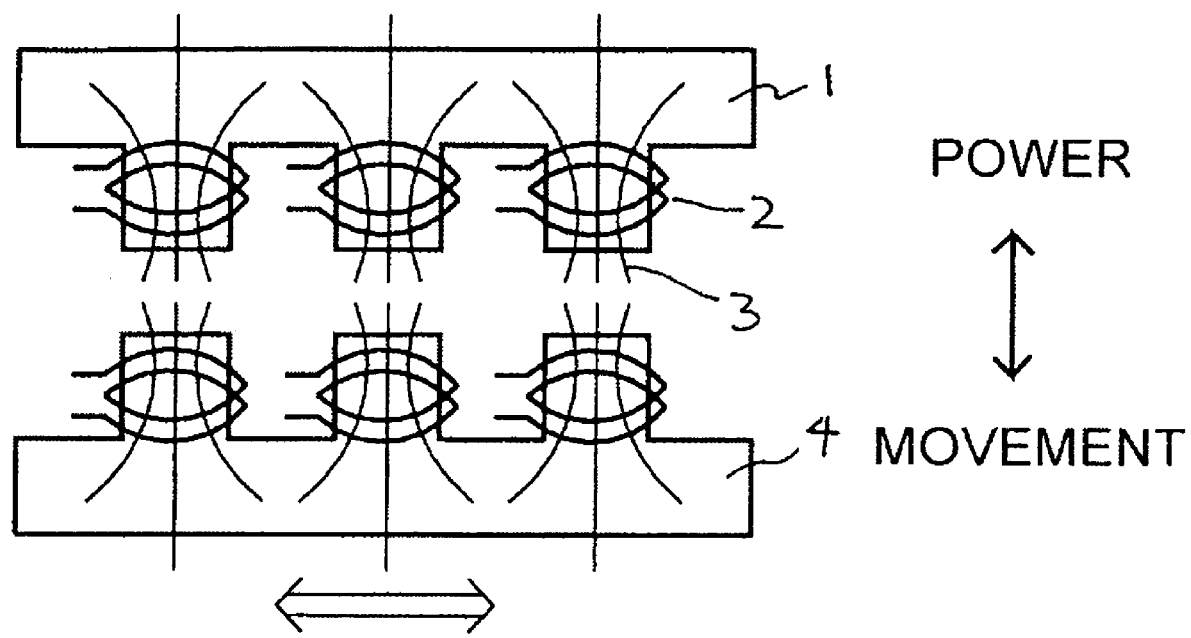
FIG. 1 illustrates an interaction of magnetic field in electromechanical machine.

Motor or generator typically employs the interaction of magnetic field as shown in FIG. 1. A power can be applied to a magnetic plane 1, for example, through the windings 2, to generate a magnetic field 3. Interaction of the magnetic field 3 with another magnetic plane 4 can provide a movement for this magnetic plane 4. Conversely, movement of the magnetic plane 4 can generate power within the windings 2 of the magnetic plane 1. In this configuration, magnetic field 3 can be directed away from the interaction, and thus produce electrical power.

Figure 2A:
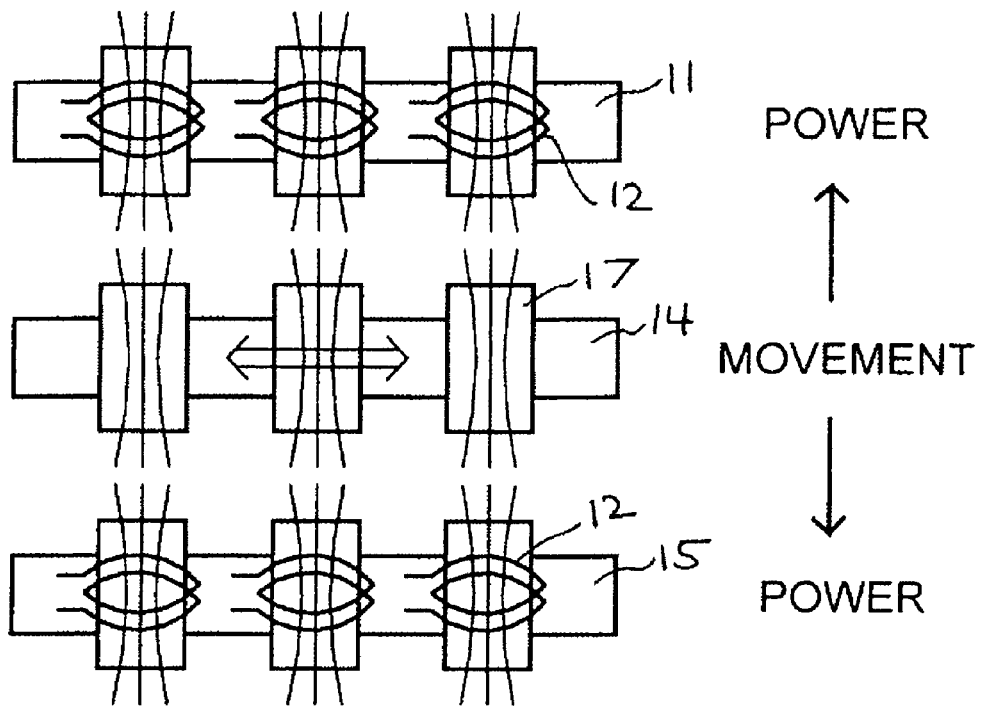
FIGS. 2A-2B illustrate schematic diagrams utilizing a double-sided rotor for generator and motor.

FIG. 2A illustrates a schematic for a generator using a double-sided rotor, providing a better utilization of the magnetic field. The magnetic plane 14 has magnets 17 (either permanent magnet or electromagnet) generating a magnetic field to two other magnetic planes 11 and 15. The magnetic plane 14 in this configuration is a double-sided rotor, and the movement of the magnetic plane 14 generates power in the windings 12 in the stationary magnetic planes 11 and 15. The composite generator includes a pair of stator 11 and rotor 14, together with a pair of stator 15 and rotor 14. The rotor 14 is double-sided, thus acting as two rotors for interacting with two stators 11 and 15.

Figure 2B:
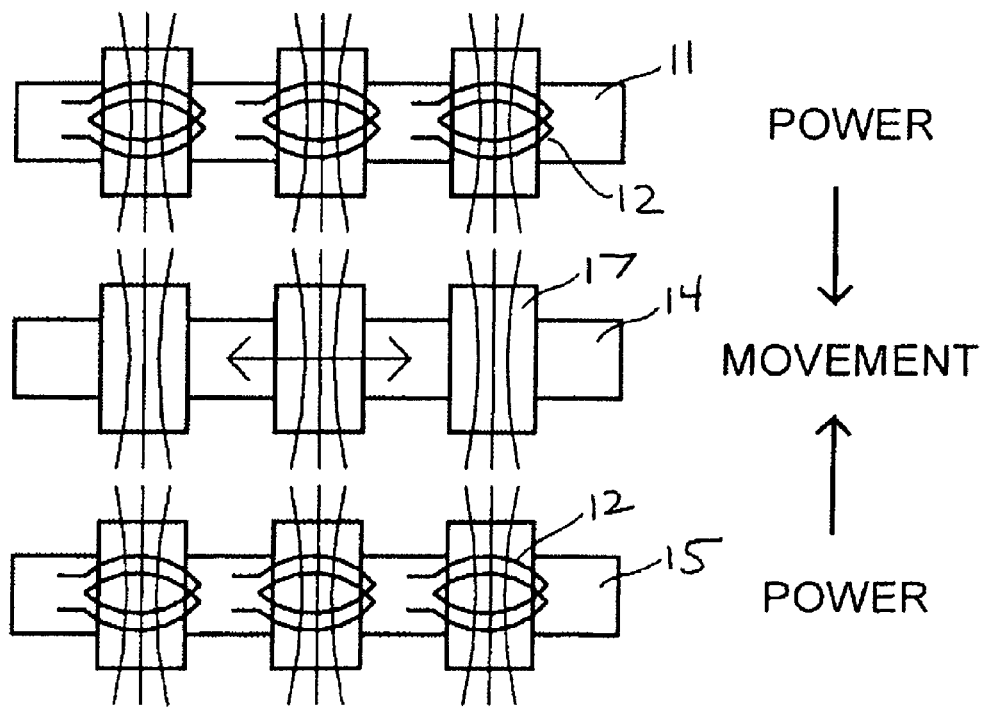

Similarly, FIG. 2B illustrates a motor utilizing a double-sided rotor with the same configuration as that of FIG. 2A. Power applied to the windings 12 of the stationary stators 11 and 15 generates a magnetic field, which interacts with the double-sided rotor 14 to move the rotor 14. In these configurations, a double-sided rotor can provide a composite machine, comprising two individual machines.

Figure 3A:
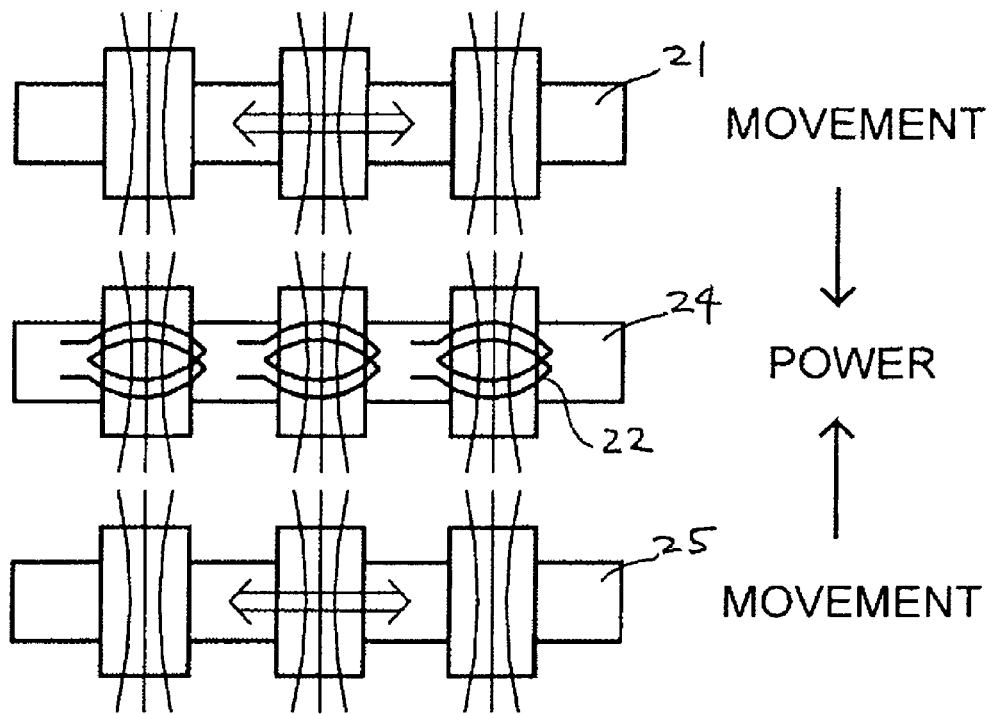
FIGS. 3A-3B illustrate schematic diagrams utilizing a double-sided stator for generator and motor.
Figure 3B:
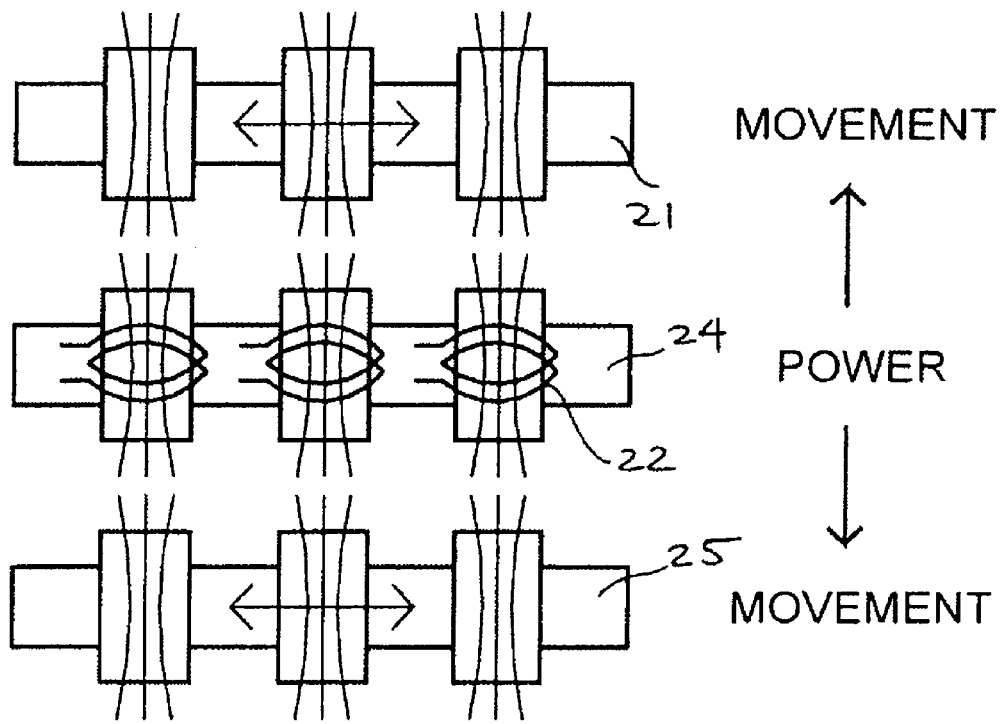

FIGS. 3A and 3B illustrate a schematic for a generator and a motor, respectively, using a double-sided stator 24. The movement of the inner and outer rotors 21 and 25 can generate a magnetic interaction in stator 24, leading to power generation in windings 22 (FIG. 3A). Conversely, power can be applied to the double-sided stator 24 to generate movement in both rotors 21 and 25 (FIG. 3B).

The present invention relates to an electromechanical machine employing a double-sided stator and dual rotors with windings or permanent magnet, and a gear mechanism for coupling the dual rotors. The present electromechanical machine can possess a variety of embodiments based on different structure of the windings and magnet arrangements, stator and rotor pairs, and gear mechanism configurations. The electromechanical machine of the present invention can provide a high torque density, high efficiency and the low construction cost.

In an embodiment, the electromechanical machine preferably includes at least one double-sided stator and at least a rotor having inner and outer working sides. The stator is inserted between the inner and outer working sides of the rotor with an air gaps between a rotor/stator surface pair, forming a rotor-stator-rotor structure. The stator preferably includes an inner stator side, an outer stator side, generally has a hollow cylindrical shape, with permanent magnet or slotted or non-slotted with winding to form electromagnet. In an aspect, the stator has a winding with a plurality of polyphase windings of electrical wires. The rotor has a generally cylindrical shape which includes an inner rotor component and an outer rotor component. The rotor can also include two separate rotors, an inner rotor and an outer rotor.

In an embodiment, a plurality of permanent magnets is mounted to the working sides of the rotors to form a brushless configuration. Alternatively, windings can be employed on the rotors to form brushed configuration.

The present double-sided stator or rotor can fully utilize the magnetic force(s) of each magnet (electromagnet or permanent magnet), and the multiplying of the electric motor components. The present invention can provide an improvement over an existing motor/generator machine (brush, brushless, DC, AC, induction, etc.), converting to multiple layering, using more than one side of the electromagnetic forces to cause the rotation of addition rotating parts or elements. It also means the combination of multiple parts of an electric motor, combined or merged into a single source of electromagnetically induced torque, typical electric motor. The magnetic plane(s) or layers encircle one another as a telescope's sections would when in its shortened or collapsed state. Each section's outer diameter is less than the next bigger sections inside diameter. Any number of electromagnetic planes, at any location can be made wider or narrower, allowing for additional electromagnetic planes to be fitted upon it, or made narrower to allow more than one electromagnetic planes to be fitted to another. The size of the machine is flexible, as it can be made to any size (length, width and height) and for any application. The present system uses multiple sources of the induced electromagnetic force to cause the rotation of one or more rotors in an electric motor having more than one rotor. In addition, sensors, such as Hall effect sensors, or other types of sensor(s) can be installed on any rotating surface.

Figure 4A:
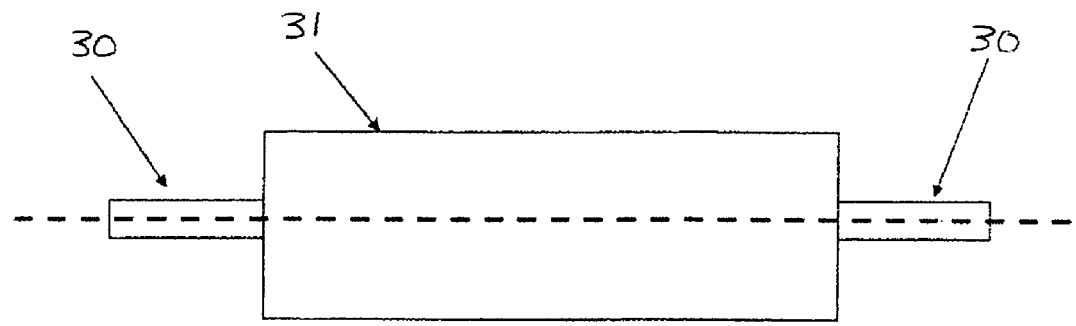
FIGS. 4A-4C illustrate an embodiment of the present electromechanical machine.

FIG. 4A illustrates a best mode of the preferred embodiment of the present invention, describing a motor, but can be equally applied to a generator. The motor includes an outer shell 31 and a shaft 30 of the motor, both of which can rotate, as the outer shell 31 makes up the outer part of the motor itself.

Figure 4B:
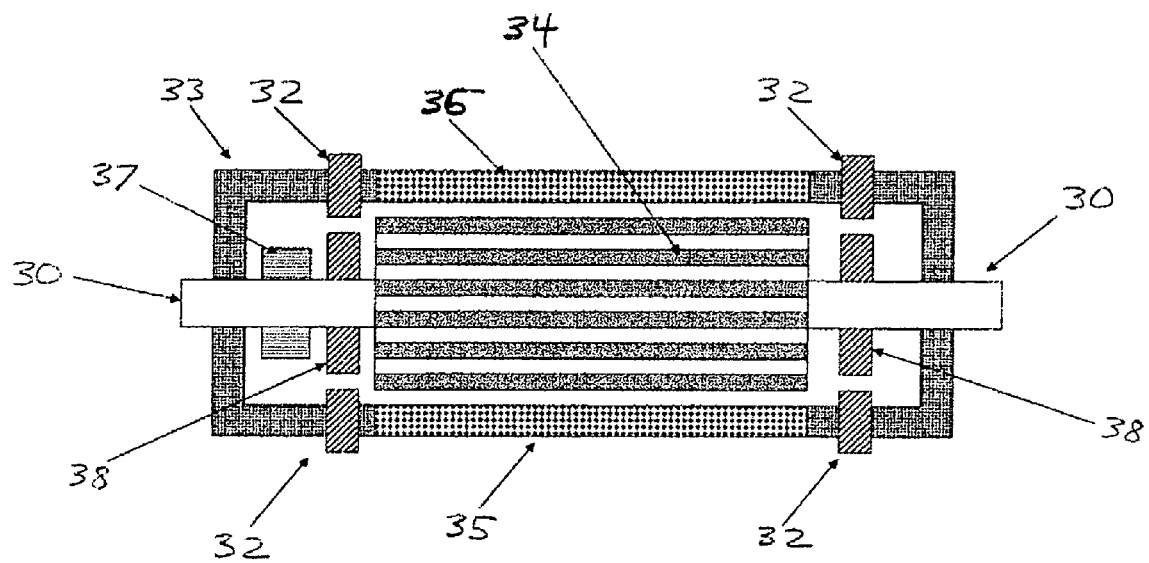

FIG. 4B illustrates the inner component of the motor, including gears 32 mounted on a stator frame 33. These gears provide a mounting point for the inner and outer rotors 34 and 31. They also provide for a torque transfer method, which combines the output power from the inner and outer rotors. A double-sided stator 36, comprising permanent magnets, or single or multiphase wound electromagnet device, which encircles the inner rotor 34, and which is encircled by the outer inverted rotor 35. These permanent magnets or windings are located both on the inner and the outer planes of the stator, and can be combined or separate from one another. An inner rotor 34 is encircled by a series of magnets (permanent magnets or windings), which provides an output torque for the motor when acted upon by the double stator 36. The inner rotor 34 can be connected to an output shaft or output shaft sleeve 30. This output medium can be configured in several ways. The first way, it can be as a traditional electric motor output shaft. The second way, the outer ends of the shaft can be made to a larger diameter with the inside hollowed out to allow for the insertion of a shaft, a shaft sleeve. The third way, the previously mentioned shaft sleeve method can be extended through the entire length of the motor. Both the second and third methods can provide for a stacking feature where several motors can be placed on one shaft, or can form a sectional shaft, which effectively simulates a single shaft. The motor can also include primary mounting bracket(s) and main structural component(s). It can also be considered the stator cage. A brush contact ring 37 is optional for a brushed version of this motor utilizing windings for the inner rotor 34. Optional inner rotor torque transfer gears 38 provide the connection point from the inner rotor 34 to the torque transfer system. The gear 38 can be a spoked gear, which would allow for the wires extending from the contact ring to the rotor.

Alternatively, the elimination of the inner rotor torque transfer gears 38 can allow for a single motor to have dual outputs, e.g., independent operation of the inner and outer rotors, with each output being controlled independently.

Figure 4C:
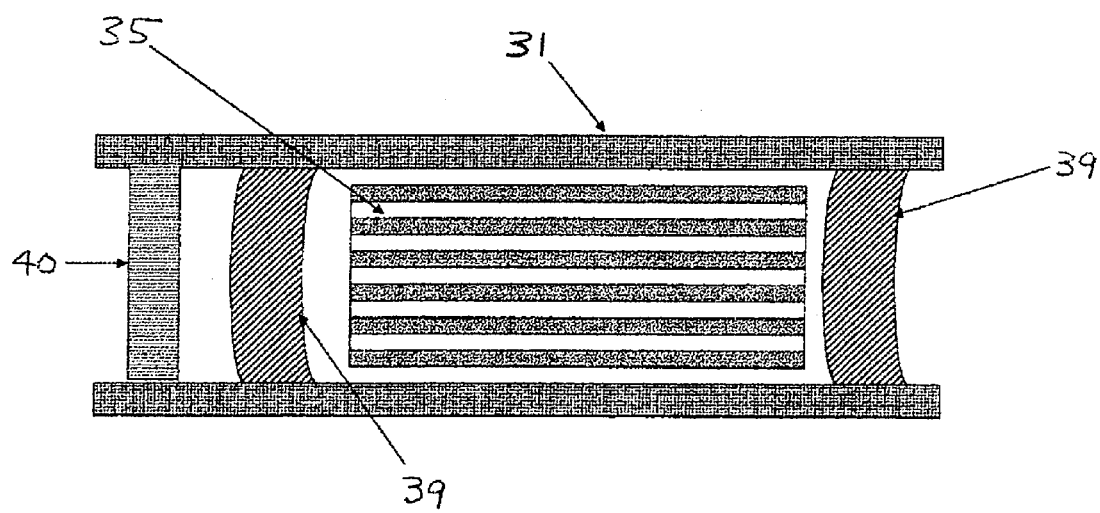

FIG. 4C illustrates an outer shell 31 and an outer rotor 35. The outer shell 31 is a main structural component for the components of the outer rotor. The outer rotor 35 consists of a series of magnets (permanent or electromagnets with windings), which are affixed to the inner circumference of the outer shell 31, effectively creating an inverted rotor or armature. The outer rotor 35 provides an output torque for the motor when acted upon by the double stator 36. There is also etched or inverted gear race(s) 39 for outer rotor 35. These gear tracks 39 are etched into the outer shell or can be affixed to the inner circumference of the outer shell 31. They also provide for one of many ways to provide a mounting and support point for the outer shell. The gear tracks also function as the outer gear of the torque transfer method, for the outer shell. Brush contact ring 40 is optional, for a brushed version of the outer rotor 35. The gear race 39 can be under-passed, which would allow for the wires extending from the contact ring to the armature.

Figure 5A:
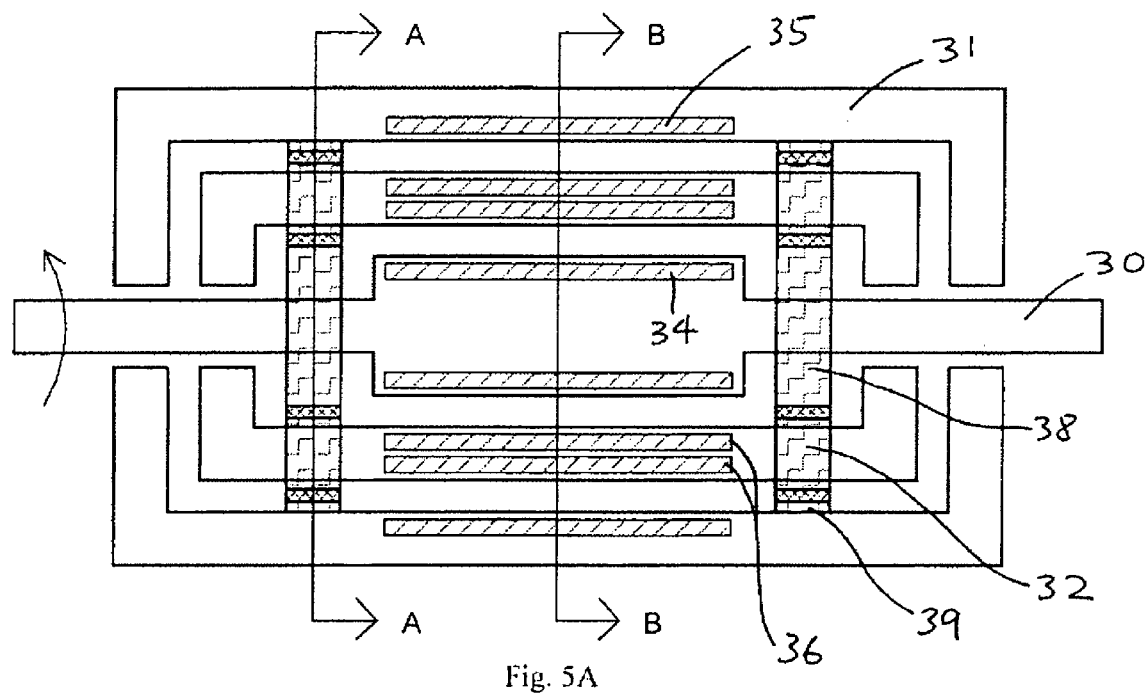
FIGS. 5A-5C illustrate other views of the double-sided stator machine.
Figure 5B:
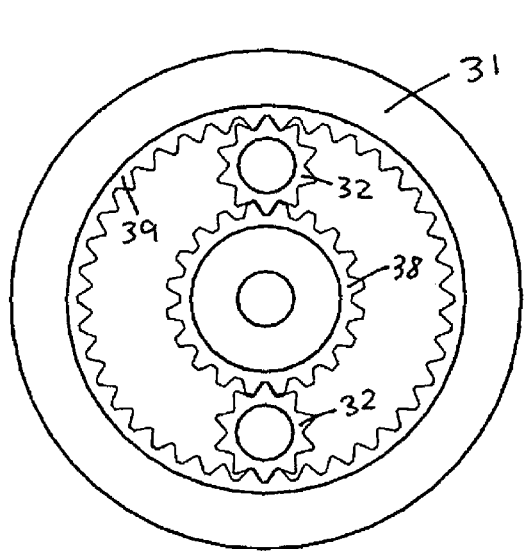
Figure 5C:
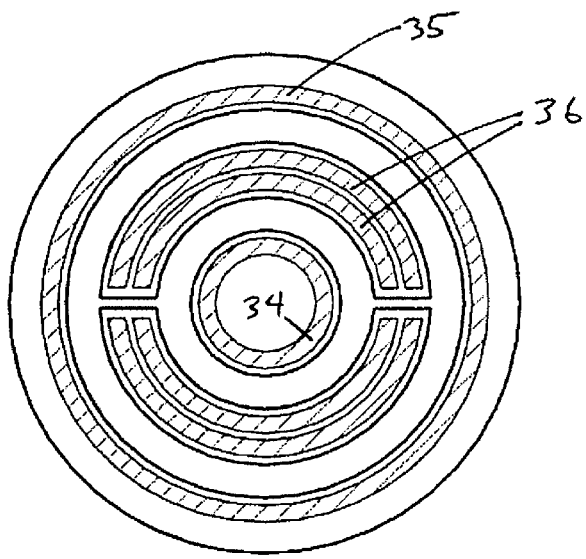

FIG. 5A illustrates another view of the double-sided stator machine, comprising an inner rotation shaft 30, and a rotating outer shell 31. The machine also comprises an inner rotor 34, outer rotor 35 and double-sided stator 36. Gear mechanism for the machine includes inner rotor gears 38, stator gears 32 and outer rotor gears 39. FIG. 5B illustrates the cross section A-A through the gear mechanism, showing gears 32 connecting with gears 39 and 38. FIG. 5C illustrates the cross section B-B, showing the double-sided stator 36 interacting with the inner rotor 34 and the outer rotor 35. Other types of gears can also be used, such as belt or cable.

Embodiments of the present invention present a novel type electric motor/generator with many unique concepts and configurations, such as the combination of at least two electric machines into one, effectively reducing the amount of needed materials and multiplying the output force by the number of machines combined.

In an embodiment, the machine can be a motor having low-speed high-torque. High-speed design can require a gearing arrangement to reduce the speed and increase the torque output. Low speed high torque motor can eliminate the need for a gearing arrangement, resulting in a significant benefit in cost, material consumption, and overall weight.

An embodiment focuses on the combination of two electric motors (or generators, or any combination of motors and generators). This is accomplished by using both sides of the stator, making a double-sided stator, or by using both sides of the rotor, making a double-sided rotor. Each one of these double-sided configurations is constructed to form a single plane (Stator Plane or Rotor Plane).

The present electromechanical machine can be constructed with permanent magnets or electromagnets, and it can function as an alternator/generator producing electrical energy. The present machine can generate induced electrical energy through normal operation, for example, additional windings can be included into the design to produce electrical power from normal operation of the motor, without resistance to its normal rotation.

The individual magnets protrude from both sides of the magnetic plane, or at least have their magnetic force extending, and exerting influence, from the topside, bottom side and all side equally. Thereby, the double-sided stator or rotor fully utilizes the force of each magnet.

Typically the magnetic planes (rotor or stator planes) are planar or concentric. There can be any number of magnetic planes. Magnetic planes can be cylindrical in shape. Outer planes are hollow cylinder to allow for the insertion of a smaller diameter magnetic planes or the motors main transmission shaft. They are either a representation of a multi-sided/multidirectional stator/rotor, or a multi-sided armature/field. The magnetic planes can have each side wired individually, thereby giving full control of each of the magnetic planes, for whichever function is desired. The magnetic plane can be a multi-sided field/armature/stator/rotor having multiple sides. This plane is constructed on a magnetic plane. Generally, one magnetic plane is located on the outside surface of the double-sided magnetic plane while another one is located on the inside surface of the double-sided magnetic plane. In addition, other magnetic planes can be added at various other locations and directions and orientations.

The permanent magnets are preferably radially magnetized, but may be magnetized using blocked, magnetic can, tapered, parallel, or interleaved methods. In addition, the permanent magnets may be comprised of ferrite magnets or rare earth magnets.

The working surface includes a plurality of radially inwardly extending teeth to receive polyphase windings of electrical wires wound around the teeth. A plurality of polyphase windings of electrical wires is preferably toroidially-wound around the stator. The windings are preferably wound as back-to-back windings. The stator may be formed by a plurality of stacked laminations that are connected together, or alternatively, may be formed by a magnetic powdered material that is compressed together or some combination thereof. The windings wound around the stator may comprise toroidially-wound windings, lap windings, wave windings, or other types of windings know in the art.

FIGS. 6A-6B illustrate an embodiment of the present machine, with the double-sided stator 36 comprising a plurality of electromagnet windings 60 for generating magnetic field to an inner rotor 34 and an outer rotor 35. FIG. 6A shows a brushless embodiment where the rotors have permanent magnets 61 and 62. FIG. 6B shows a brushed embodiment where the rotors have electromagnet windings 63 and 64.

FIG. 7 illustrates an embodiment of the present machine, with the double-sided stator 36 comprising a plurality of permanent magnets 70 for generating magnetic field to an inner rotor 34 and an outer rotor 35. FIG. 7 shows a brushed embodiment where the rotors have electromagnet windings 73 and 74.

FIGS. 8A-8E illustrate various configurations for the present electromechanical machine having a double-sided stator and dual inner/outer rotors working like two conventional machines, with one machine on the inside and the other machine on the outside.

Figure 8A:
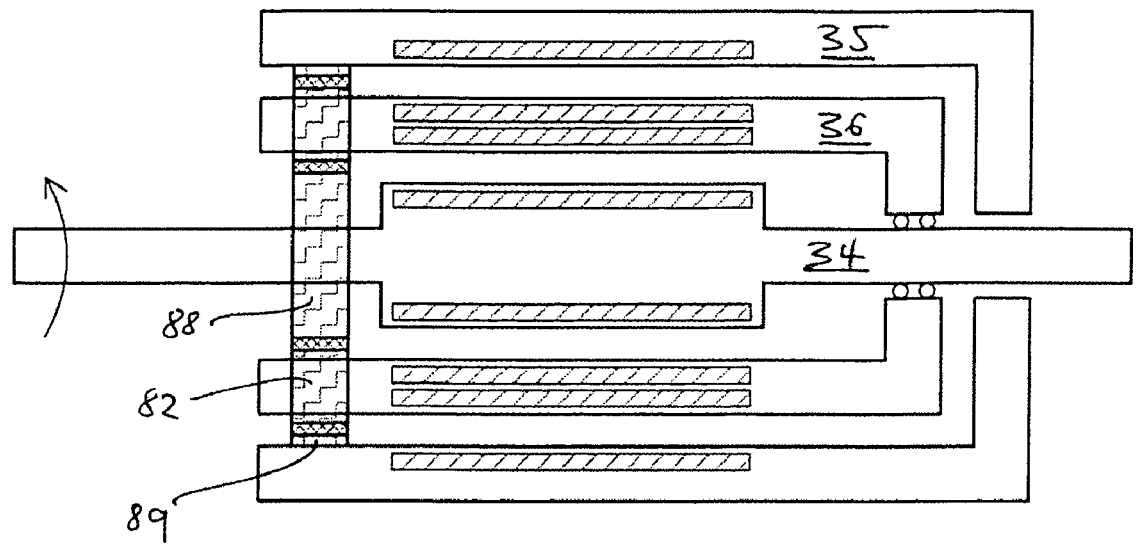
FIGS. 8A-8E illustrate various embodiments of the present machine.

FIG. 8A shows an embodiment of the present machine where the gear mechanism 88, 82 and 89 is positioned only at one end of the rotor/stator pairs. The double-sided stator 36 can be coupled to the inner rotor 34 through a bearing, thus can be stationary when the inner rotor rotates. The outer rotor 35 can rotate in a same direction with respect to the inner rotor 34 (for example, through the gear mechanism as shown in FIG. 5B). If the outer rotor 35 is kept stationary, the double-sided stator 36 can rotate with respect to the outer rotor 35, and the inner rotor 34 can rotate with respect to the double-sided stator 36. Thus the inner rotor 34 can receive the power from both pairs of rotor/stator. Alternatively, if the inner rotor 34 is kept stationary, the outer rotor 35 can receive the power from both pairs of rotor/stator.

In an embodiment, the present machine can comprise a rotatable stator, a rotatable double-sided stator, a stationary rotor, or a stationary double-sided rotor. For example, in FIG. 8A, the inner rotor 34 can be stationary, and the double-sided stator 36 can rotate around the stationary rotor 34. And the rotor 35 further rotates around the rotating double-sided stator 36. In this configuration, the rotor 35 can have the combined power of the rotor/stator pair 34/36 and the rotor/stator pair 35/36. Alternatively, the outer rotor 35 can be stationary with the double-sided stator 36 rotating around it. The inner rotor 34 then rotates around the rotating double-sided stator 36.

Figure 8B:
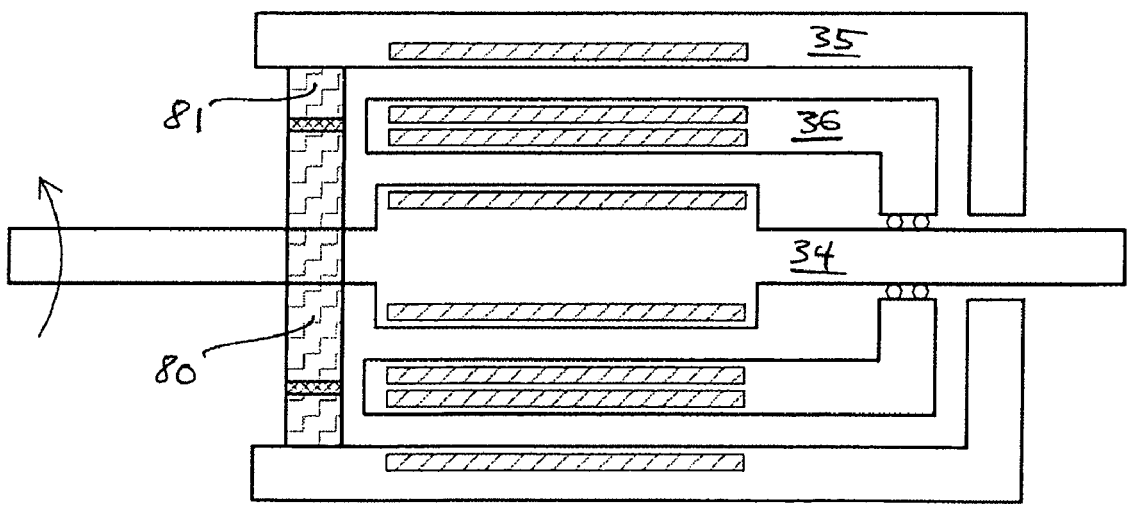

FIG. 8B shows an embodiment of the present machine where the gear mechanism only couples the inner rotor 34 and the outer rotor 35 with gear 80 attached to the inner rotor 34 and gear 81 attached to the outer rotor 35. As shown, the double-sided stator 36 is coupled to the inner rotor shaft through a set of bearing(s).

In an embodiment, the machine can have a shaft or a shaft-sleeve. The concept behind the shaft sleeve is to provide for a stacking feature, where any number of motors can be added or removed, to/from a common shaft. This common shaft accommodates the possibility to combine the output of several electric motors onto one shaft, without the mechanical loss associated with gearing systems. In this configuration, the output force is multiplied by the number of motors on the shaft. Physical space and shaft strength are the only limitation for this stacking. An additional benefit of the stacking feature is instead of replacing the motor when the power requirement changes or it fails, just add or remove one or more motors.

The shaft of the machine can be made longer than the body of the motor having the shaft extended from the motor on either end or both depending on its application. This shaft can be used to add additional motors thereby creating a stack of motors. These additionally stacked motors can also function independently all the way down to the individual plane level in each of the separate motors. Alternately, the shaft can be replaced by a sleeve, hollowed and grooved inside, allowing for the insertion of a shaft. The shaft can be secured by any feasible method. This can facilitate the stacking of these motors. Further, each motor/generator can be powered on or off as needed.

The composite machine can be configured to combine their power, thus significantly increasing the torque or speed of a motor, or the power generation of a generator.

Figure 8C:
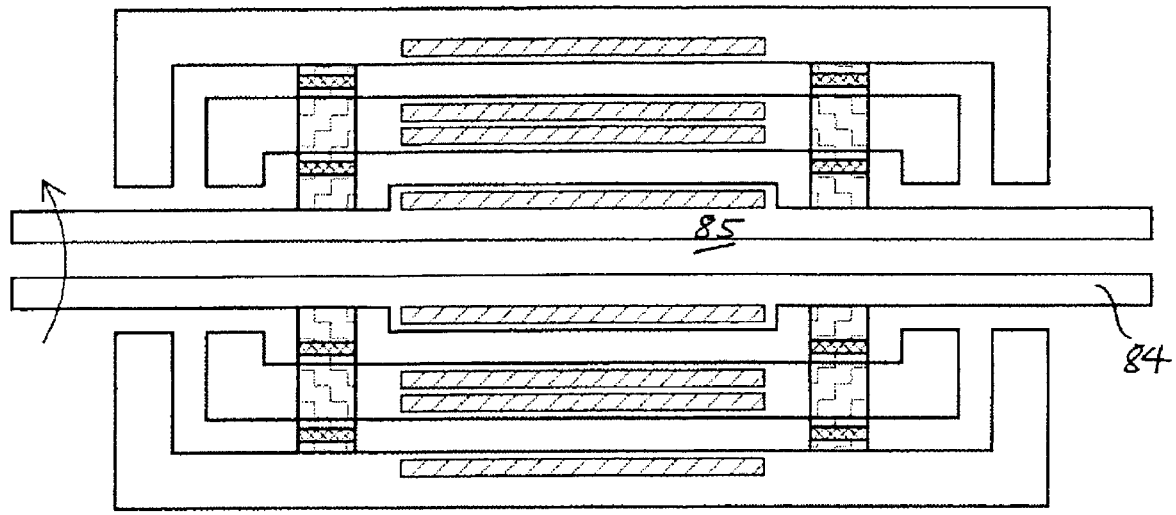

FIG. 8C shows an embodiment incorporating a shaft sleeve 84. The inner rotor 85 is a hollow cylinder to accommodate the shaft sleeve. Alternatively, the inner rotor can be a solid cylinder (not shown) where the shaft sleeve 84 is hollow outside the solid cylinder.

In addition, cooling mechanism can be incorporated for cooling purpose. A fan mechanism at each end of the machine creates positive ventilation, such as a back-plate and a front-plate holding the rotors and stator can be slotted to create a fan-like action/effect. This will be used to provide sufficient airflow across the internals of the motor, providing a cooling effect. For example, a fan at one end is used for intake and a fan at the other end is used for exhaust. Any type of aspiration method, with or without filtration can be used, as long as it or in combination with, can supply sufficient air intake for purposes of transferring heat. In addition, heat transfer for the machine can be increased and improved by the addition of highly conductive material(s) for thermal management. An attachment or method to hold a filtering device can be incorporated on all ends, or a permanent filter can be used.

Figure 8D:
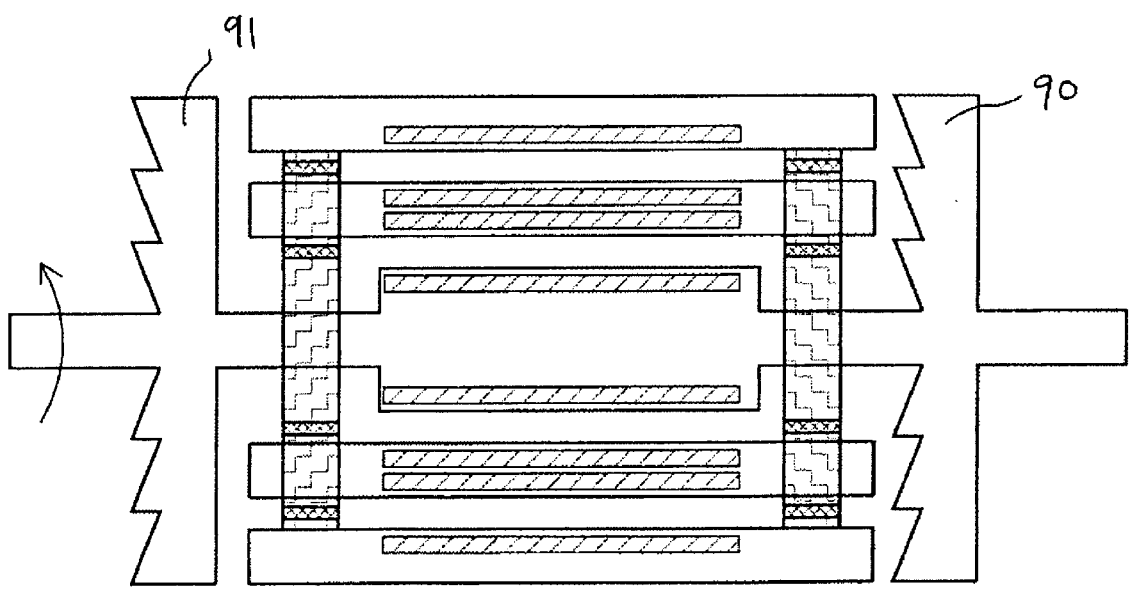

FIG. 8D shows an embodiment incorporating a fan mechanism at the ends of the rotor/stator pairs. Two fan-like blades 90 and 91 can be slotted to create an air flow across the rotors and stator for cooling purpose.

Figure 8E:
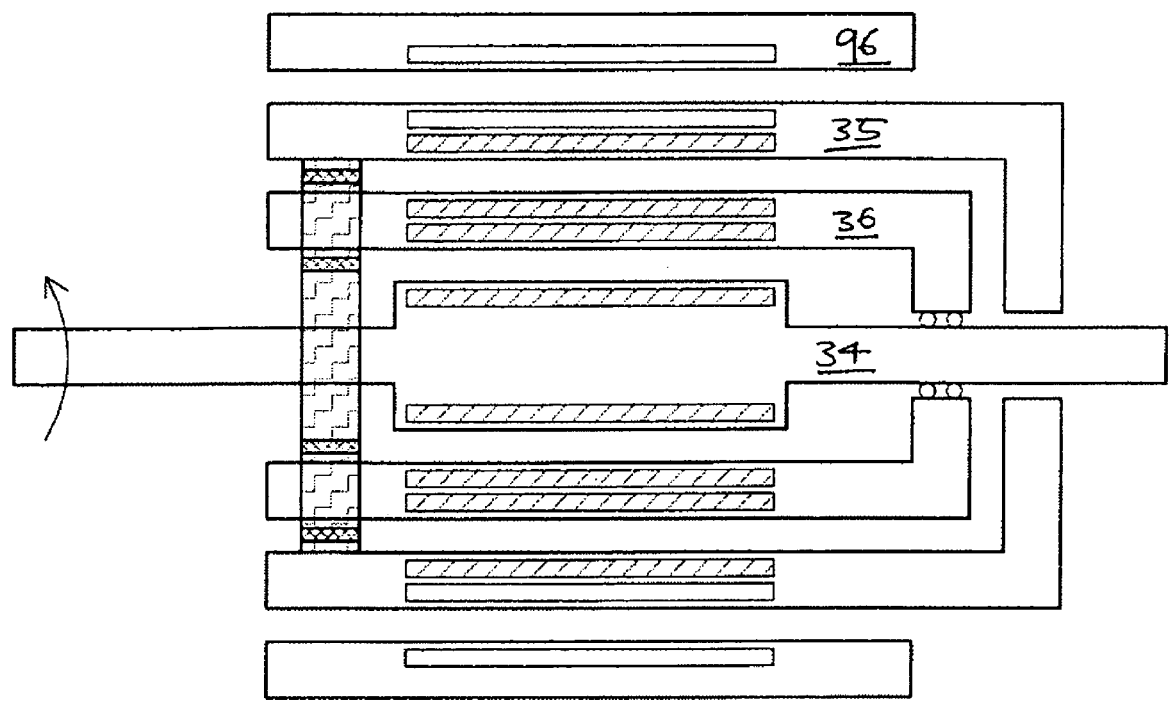

FIG. 8E shows an embodiment incorporating an additional rotor/stator pair. The outer rotor 35 is converted to a double-sided rotor and an additional outer stator 96 is added. The incorporation of the addition rotor/stator pair can further enhance the power of the machine.

While the invention has been described with reference to preferred embodiments, it is to be understood that the invention is not intended to be limited to the specific embodiments set forth above. For example, features in one embodiment can be incorporated in other embodiments, such as fan-like ends of FIG. 8D can be used in multiple double-sided rotor/stator configurations in FIG. 8E.

What is claimed is:

1. An electromechanical machine comprising:
   a double-sided stator comprising an inner stator side and an outer stator side;
   an inner rotor comprising at least one of a permanent magnet and a rotor winding, the inner rotor having a first rotor side facing the inner stator side;
   an outer rotor comprising at least one of a permanent magnet and a rotor winding, the outer rotor having a second rotor side facing the outer stator side; and
   a gear mechanism to couple the inner rotor and the outer rotor, acting as a locking mechanism to keep the outer rotor in place, comprising
      two frame gears mounted on two ends of the double-sided stator frame, providing the mounting point for the inner rotor and the outer rotor; and
      two inverted gear races on the inner circumference of an outer shell housing the outer rotor, the inverted gears coupled with the frame gears to provide support for the outer shell.

2. An electromechanical machine as in claim 1 wherein the double-sided stator is concentrically disposed between the inner rotor and the outer rotor.

3. An electromechanical machine as in claim 1 wherein the inner and outer rotor comprise a permanent magnet and the double-sided stator comprises a stator winding.

4. An electromechanical machine as in claim 1 wherein the double-sided stator comprises a permanent magnet.

5. An electromechanical machine as in claim 1 wherein the double-sided stator comprises at least a stator winding, and the electromechanical machine further comprising a brush mechanism to interface with the stator winding.

6. An electromechanical machine as in claim 1
wherein at least one of the inner rotor core and the outer rotor core is a double-sided rotor, and
the electromechanical machine further comprises at least a second stator facing the double-sided rotor.

7. An electromechanical machine as in claim 1 wherein the gear mechanism comprises one of gears, bearings, belts, and cable.

8. An electromechanical machine as in claim 1 wherein the gear mechanism comprises a first gear coupled to the inner rotor and a second gear coupled to the outer rotor, and wherein the first and the second gears are coupled to each other.

9. An electromechanical machine as in claim 1 wherein the gear mechanism comprises a first gear coupled to the inner rotor, a second gear coupled to the outer rotor, and a third gear coupled to the double-sided stator, and wherein the first and third gears and the second and third gears are coupled to each other, respectively.

10. An electromechanical machine as in claim 1 wherein the gear mechanism further acts as a locking mechanism to keep the outer rotor in its place.

11. An electromechanical machine as in claim 1 further comprising a fan blade assembly for providing a positive air flow along the rotor and the stator.

12. An electromechanical machine as in claim 1 operating as a motor.

13. An electromechanical machine as in claim 1 operating as a generator.

14. An improvement to an electromechanical machine, the electromechanical machine comprising:
a double-sided stator comprising an inner stator side and an outer stator side;
an inner rotor comprising at least one of a permanent magnet and a rotor winding, the inner rotor having a first rotor side facing the inner stator side; and
an outer rotor comprising at least one of a permanent magnet and a rotor winding, the outer rotor having a second rotor side facing the outer stator side, the improvement comprising:
a gear mechanism to couple the inner rotor and the outer rotor, acting as a locking mechanism to keep the outer rotor in place, comprising
two gears mounted on two ends of the double-sided stator frame, providing the mounting point for the inner rotor and the outer rotor; and
two inverted gear races on the inner circumference of an outer shell housing the outer motor, the inverted gears coupled with the frame gears to provide support for the outer shell.

15. An improvement as in claim 14 wherein the gear mechanism comprises one of gears, bearings, belts, and cable.

16. An improvement as in claim 14 wherein the gear mechanism comprises a first gear coupled to the inner rotor and a second gear coupled to the outer rotor, and wherein the first and the second gears are coupled to each other.

17. An improvement as in claim 14 wherein the gear mechanism comprises a first gear coupled to the inner rotor, a second gear coupled to the outer rotor, and a third gear coupled to the double-sided stator, and wherein the first and third gears and the second and third gears are coupled to each other, respectively.

18. An electromechanical machine comprising:
a double-sided stator comprising an inner stator side and an outer stator side;
an inner rotor comprising at least one of a permanent magnet and a rotor winding, the inner rotor having a first rotor side facing the inner stator side;
an outer rotor comprising at least one of a permanent magnet and a rotor winding, the outer rotor having a second rotor side facing the outer stator side; and
a gear mechanism to couple the inner rotor and the outer rotor,
wherein at least one of the inner rotor core and the outer rotor core is a double-sided rotor, and
the electromechanical machine further comprises at least a second stator facing the double-sided rotor.

19. An electromechanical machine as in claim 18 operating as a motor.

20. An electromechanical machine as in claim 18 operating as a generator.

* * * * *